May 25, 1937.  W. T. BIRDSALL  2,081,888
CONFECTION COATING MACHINE
Filed Dec. 10, 1930   8 Sheets-Sheet 1

INVENTOR
WILFRED T. BIRDSALL
BY Janney, Blair & Curtis
ATTORNEYS

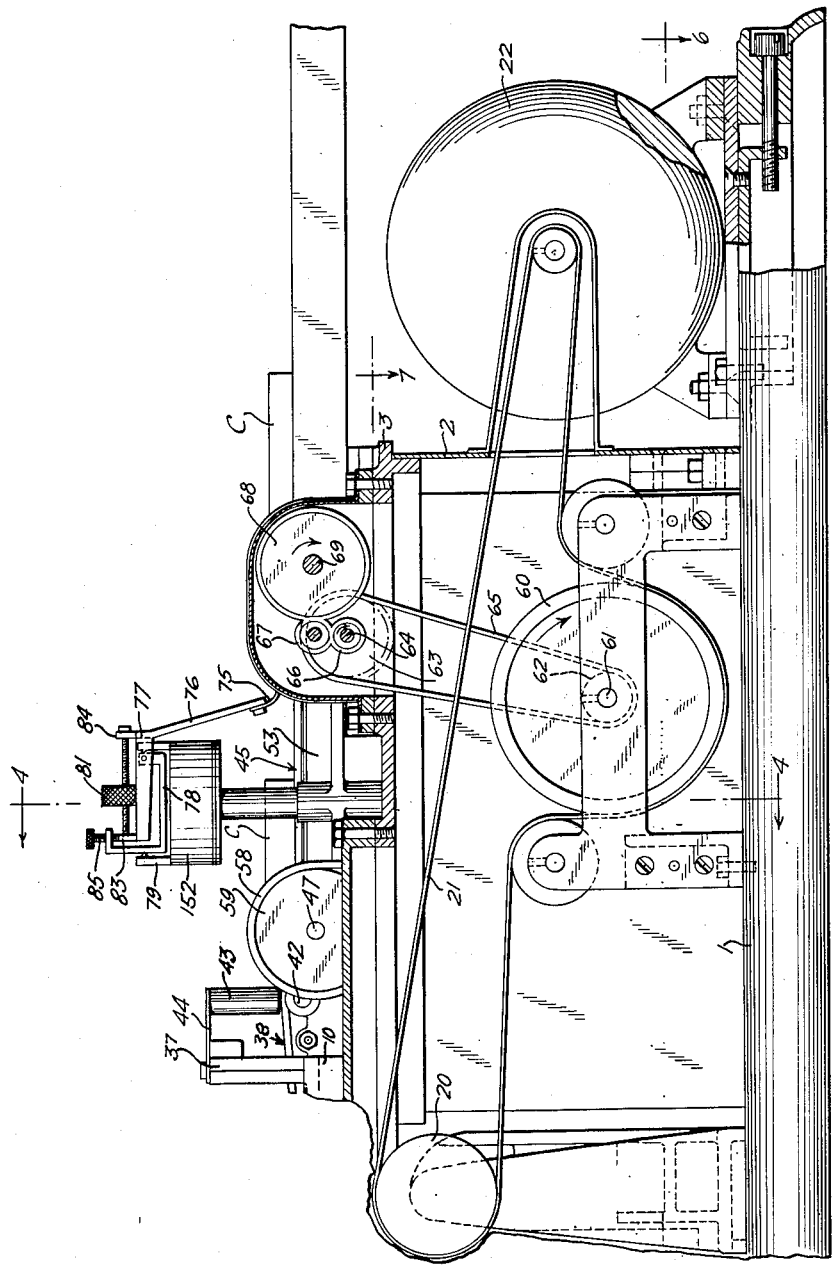

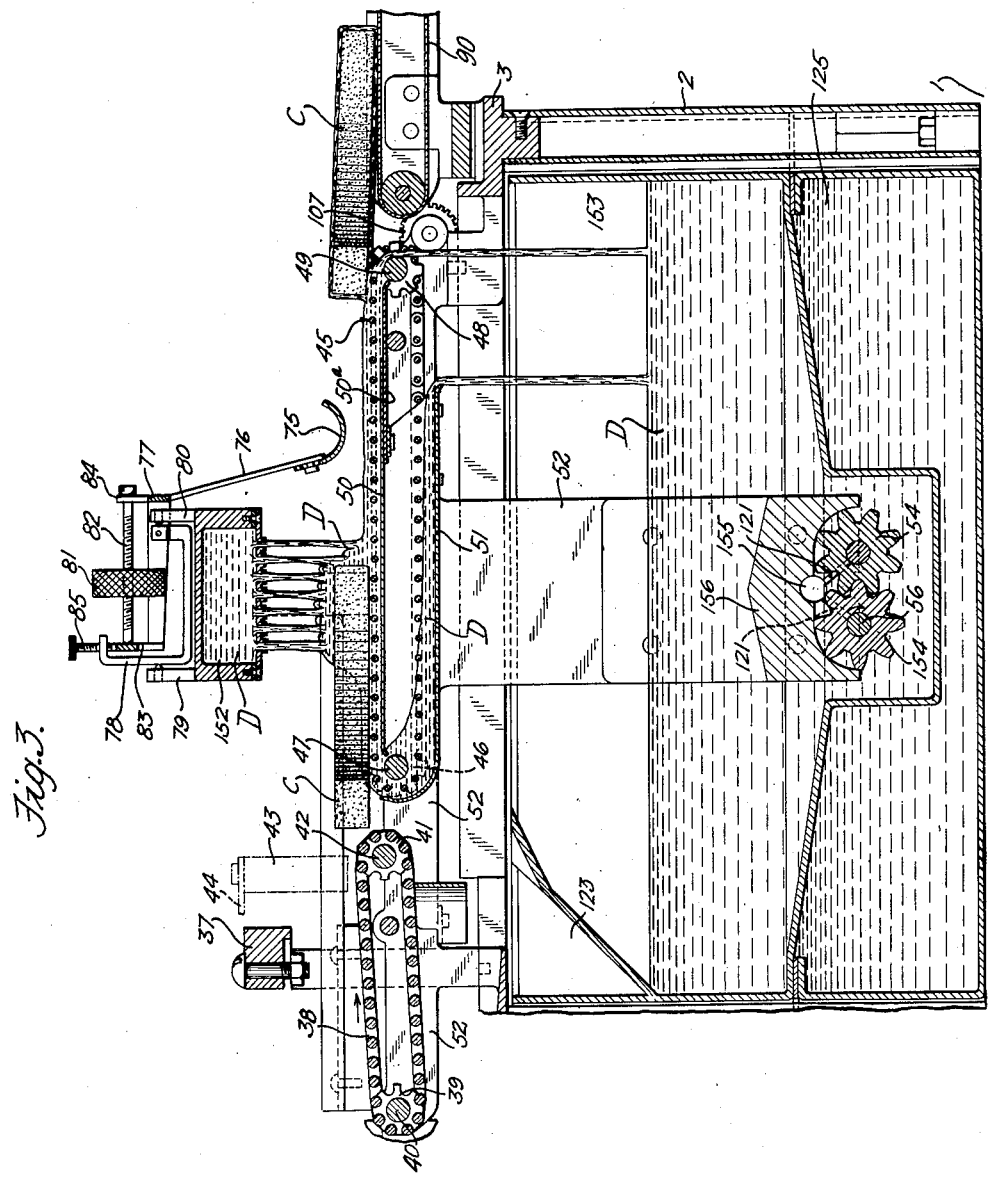

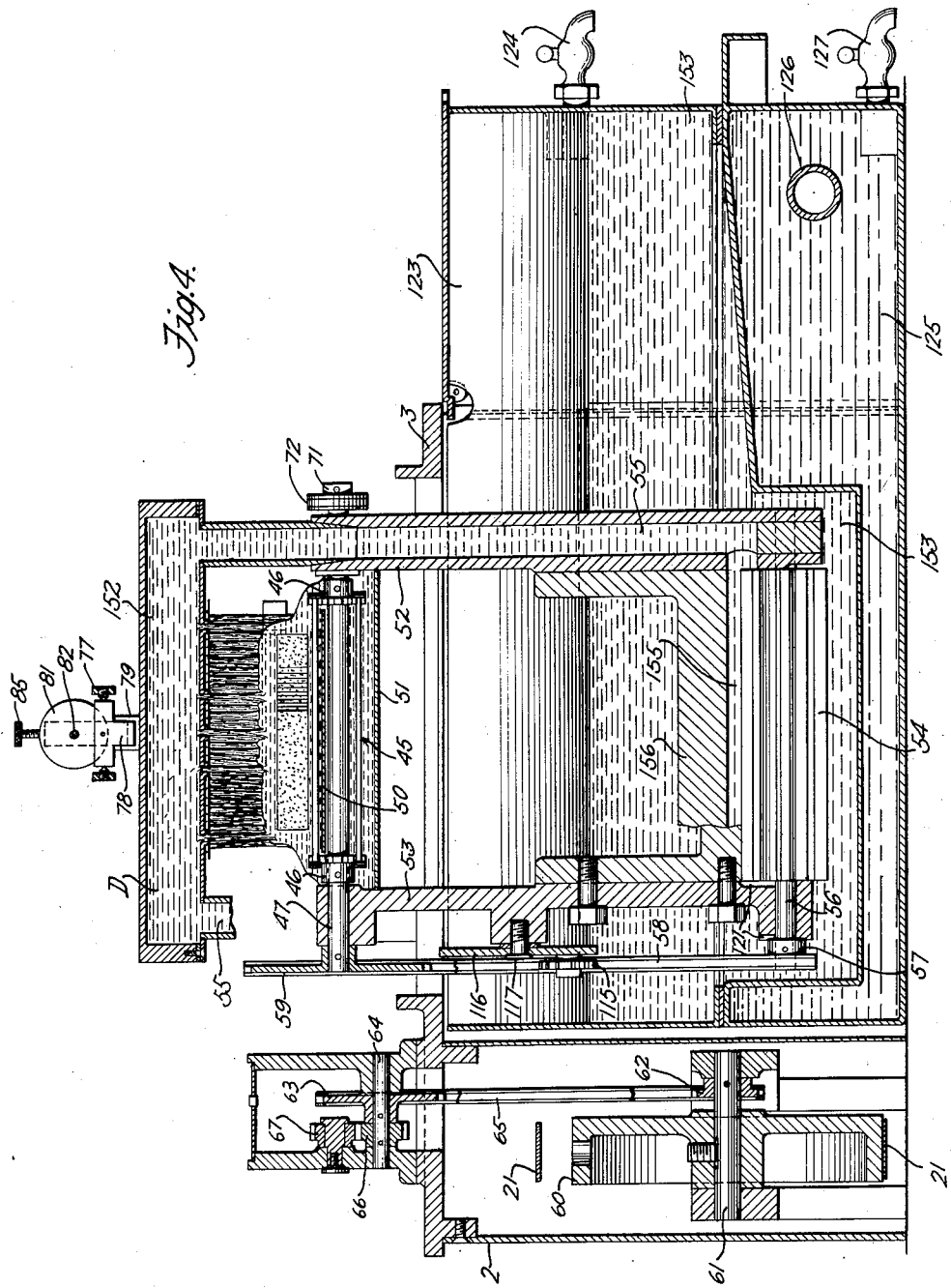

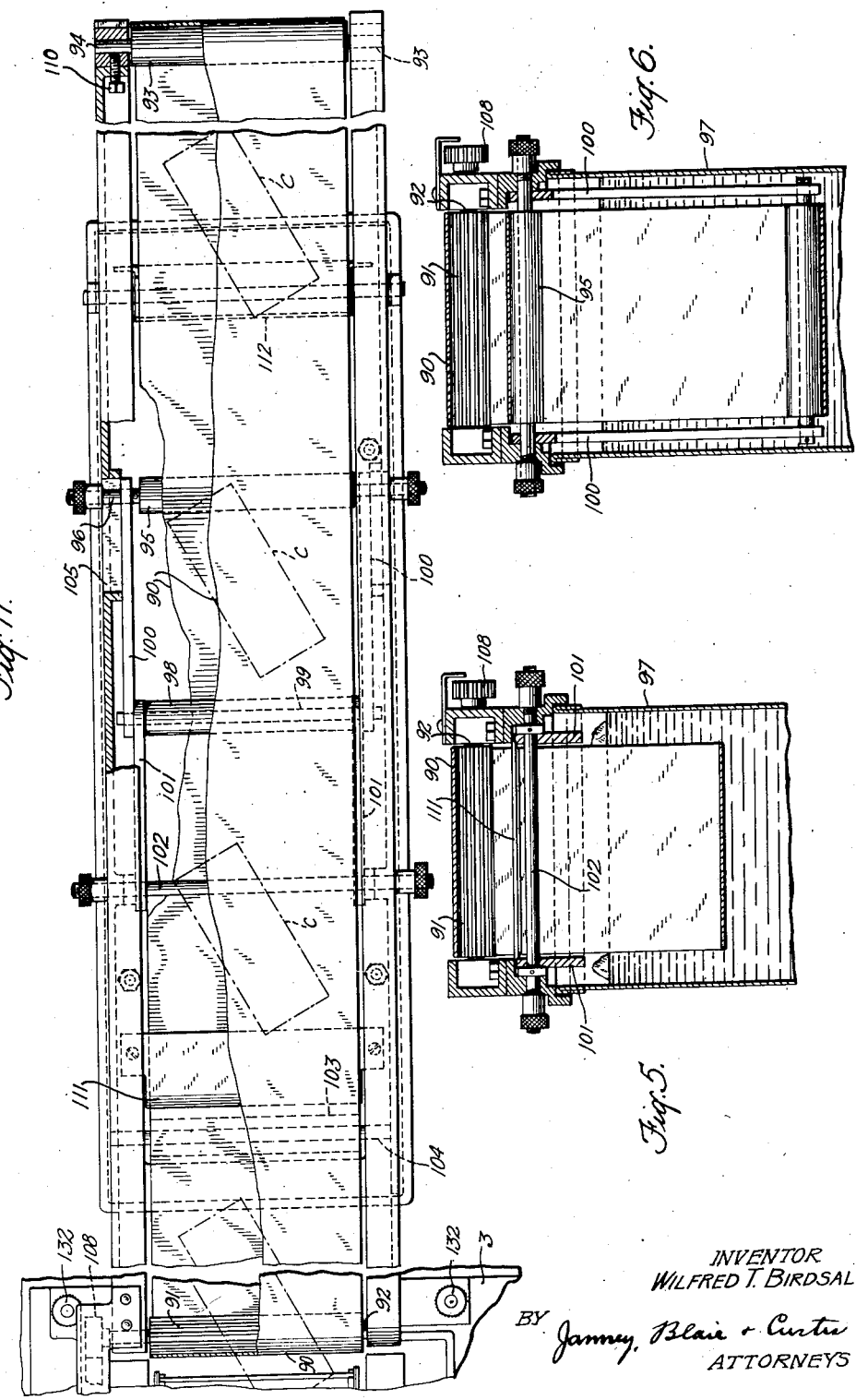

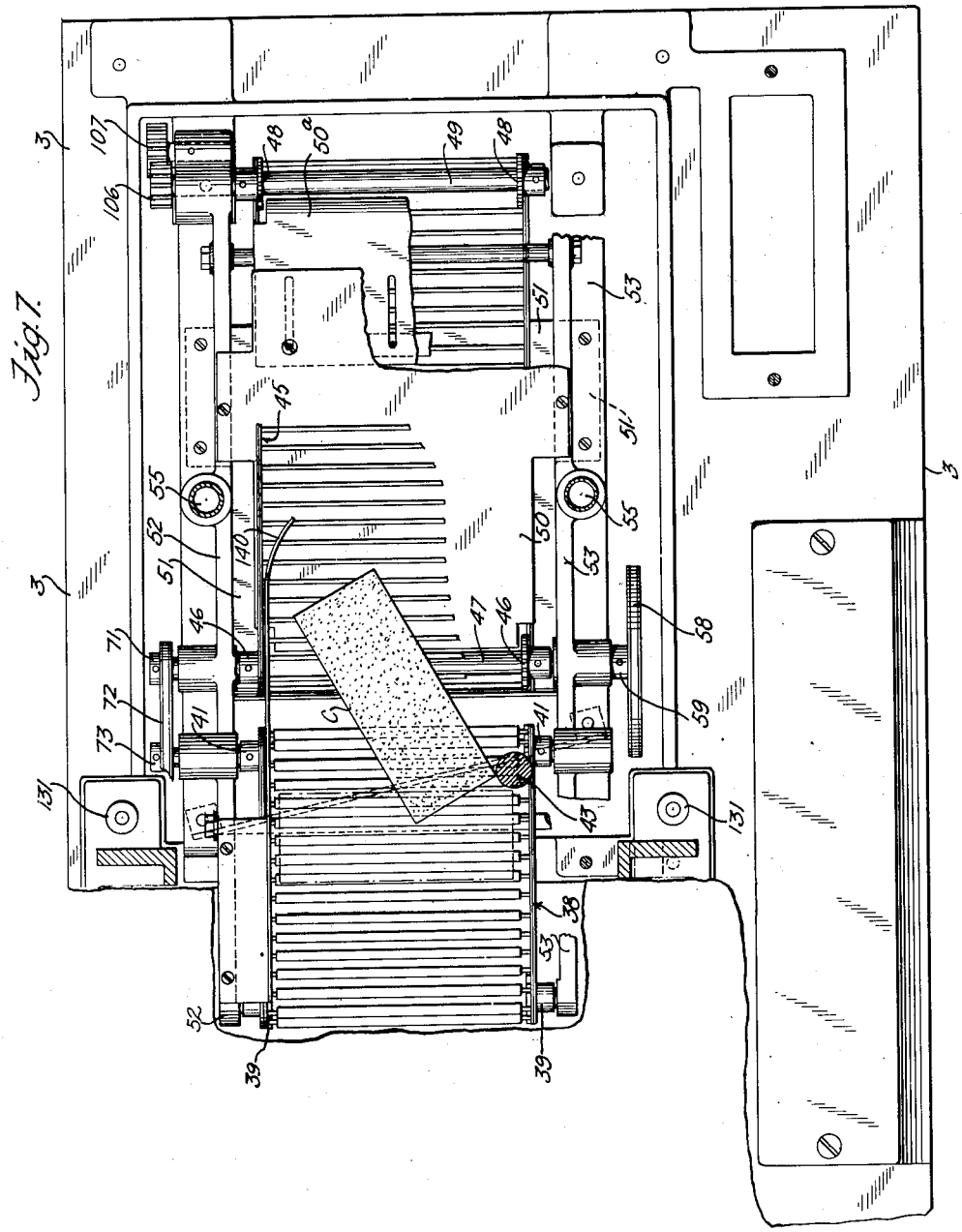

May 25, 1937.    W. T. BIRDSALL    2,081,888
CONFECTION COATING MACHINE
Filed Dec. 10, 1930    8 Sheets-Sheet 7
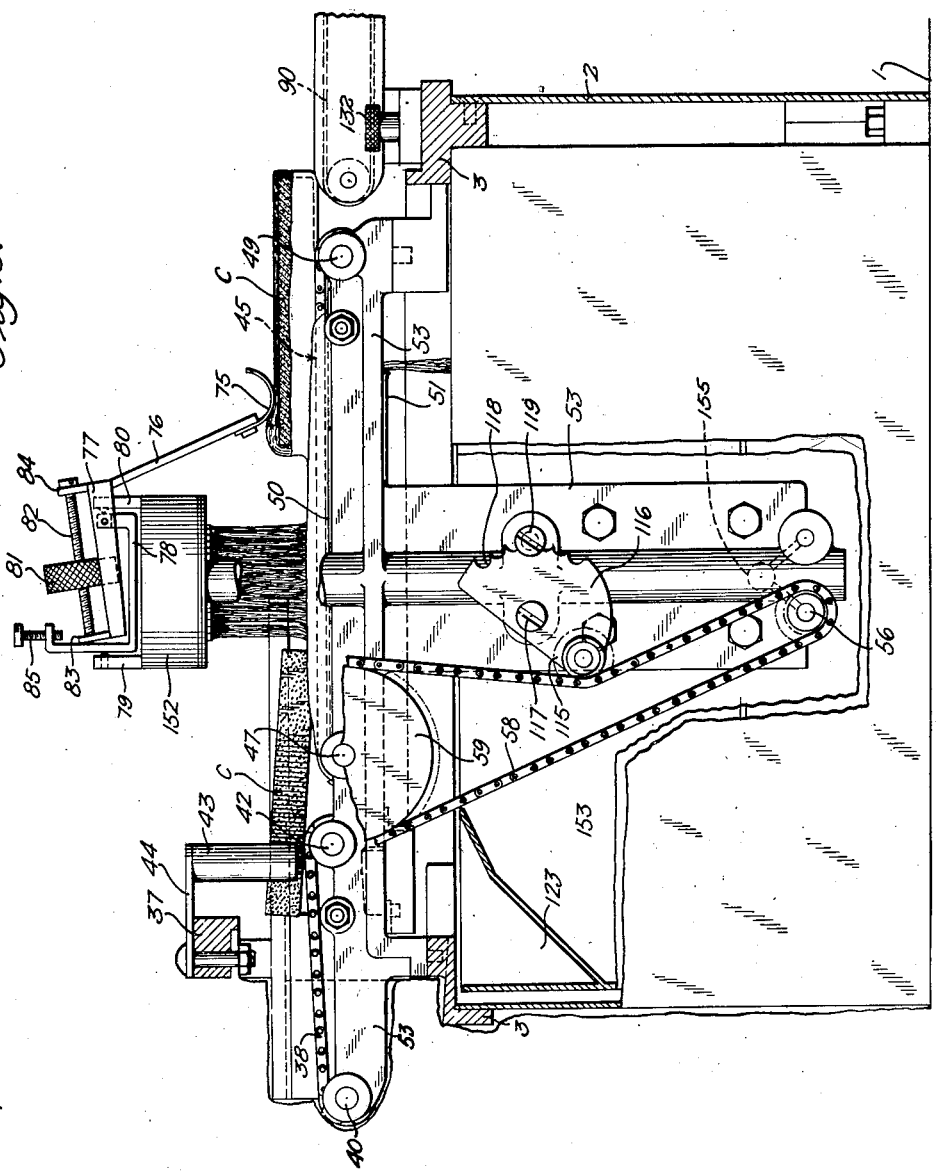
INVENTOR
WILFRED T. BIRDSALL
BY
Janney, Blair — Curtis
ATTORNEYS May 25, 1937. W. T. BIRDSALL 2,081,888
CONFECTION COATING MACHINE
Filed Dec. 10, 1930 8 Sheets-Sheet 8
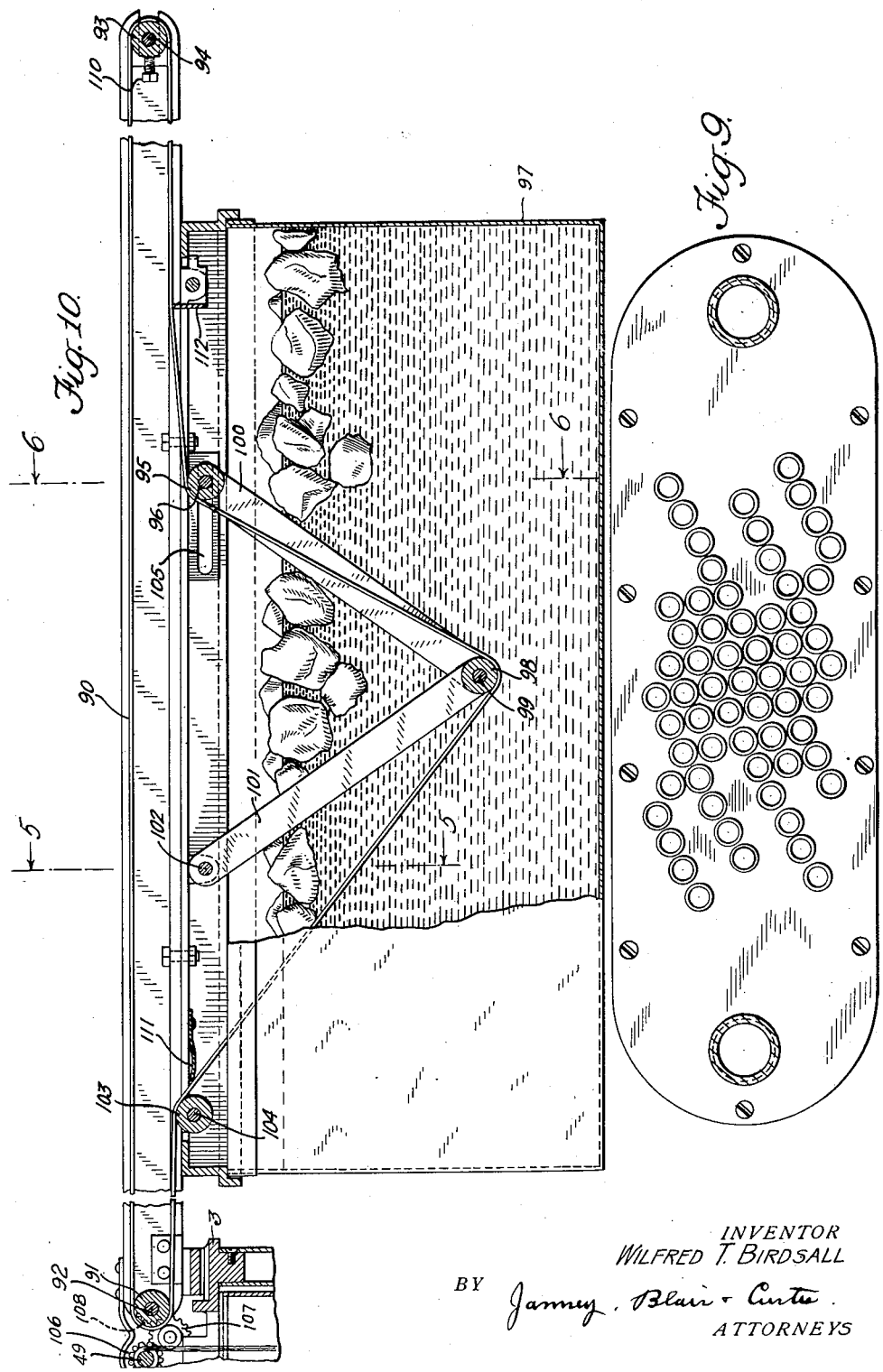
INVENTOR
WILFRED T. BIRDSALL
BY Janney, Blair & Curtis
ATTORNEYS Patented May 25, 1937

2,081,888

UNITED STATES PATENT OFFICE 2,081,888

CONFECTION COATING MACHINE

Wilfred T. Birdsall, New York, N. Y., assignor, by mesne assignments, to Eskimo Pie Corporation, New York, N. Y., a corporation of Delaware Application December 10, 1930, Serial No. 501,221

4 Claims. (Cl. 91—3)

This invention relates to machines for coating confections, and particularly to machines for coating frozen confections.

It is an object of the invention to provide an efficient machine for coating confections.

It is a further object to provide a machine which is adapted to present small cakes or bricks of ice cream or the like to mechanism for coating the same on all sides; and to deliver the coated cakes or bricks to a delivery station for storage or shipment, as the case may be.

It is a further object to provide a portable machine of the type referred to which may be readily moved from place to place.

One illustrative embodiment of the invention is shown in the drawings, in which:—

Fig. 2 is a sectional view taken on the line 2—2 of Fig 1.

Fig. 3 is a sectional view taken on the line 3—3 of Fig. 1.

Fig. 4 is a sectional view taken on the line 4—4 of Fig. 2.

Fig. 5 is a section on line 5—5 of Fig. 10.

Fig. 6 is a section on line 6—6 of Fig. 10.

Fig. 7 is a sectional view taken on the line 7—7 of Fig. 2.

Fig. 8 is an enlarged sectional view taken on the line 8—8 of Fig. 1.

Fig. 9 is an enlarged plan view of the underside of the chocolate enrober head.

Fig. 10 is an enlarged longitudinal sectional view of the delivery end of the machine.

Fig. 11 is a top plan view partly in section of the delivery end of the machine.

Figure 1:
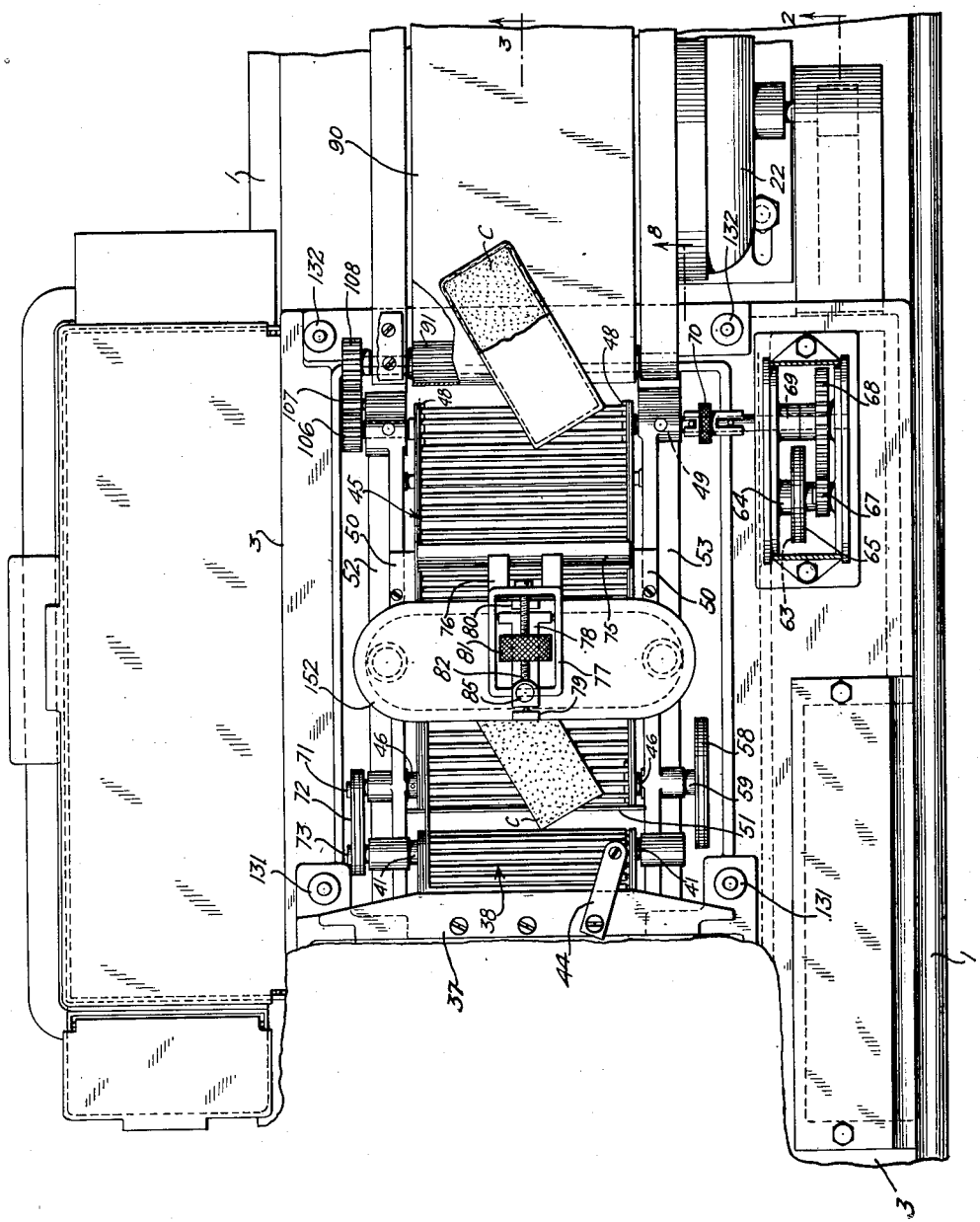
Figure 1 is a top plan view partly in section of a machine embodying the invention.

Referring to Figs. 1 through 3 which show an illustrative machine embodying the invention, a cake or brick of ice cream is placed on an endless conveyor 38 trained over sprocket wheels 39 on a shaft 40 and over sprocket wheels 41 on a shaft 42, said shafts being journaled in frame castings 52 and 53 (see Fig. 1) which rest on top plate 3. The conveyor preferably consists of two endless chains which carry spaced cross rods to support the cake. Conveyor 38 is moved in the direction of the arrow in the manner hereinafter explained. Shaft 42 is preferably located at a higher level than shaft 40 to incline the conveyor 38 upwardly in the direction of its travel. The purpose of the upward inclination of conveyor 38 is best explained by reference to Fig. 7. In said figure a cake designated C is shown in two different positions on the conveyor, one position being shown in broken lines, and the other position being shown in full lines. The position shown in broken lines is the position taken by the cake when it falls on the conveyor 38. The coating of the cake is facilitated by passing the cake lengthwise through the coating mechanism. It is therefore desirable to turn the cake from the position shown in broken lines to the position shown in full lines prior to its presentation to the coating mechanism. For this purpose a deflector 43 is positioned over the conveyor 38 adjacent one side thereof and near its take-off end to engage and retard one end of the cake and cause the cake to swing into the position shown in full lines. Because of the upward inclination of the conveyor and the location of the deflector near the take-off end thereof, the cake during this turning movement will have a small surface contact with the cross rods of the conveyor, thus facilitating its turning movement.

As shown in Fig. 2, deflector 43 is supported by a bracket 44 adjustably secured to extension 37 of casting 10 to permit swinging deflector 43 to different positions.

After the cake has been turned in a lengthwise direction by deflector 43 it passes onto an enrobing conveyor 45 which is trained over sprocket wheels 46 on a shaft 47 at one end and over sprocket wheels 48 on a shaft 49 at the other end, said shafts being journaled in the castings 52 and 53. Conveyor 45 is similar to conveyor 38, except that the cross rods are spaced somewhat farther apart to permit free movement of the chocolate coating mixture between the rods as hereinafter more fully explained. As shown in Fig. 3, the conveyor 45 is located slightly below the take-off end of conveyor 38 so that when a cake passes from conveyor 38 to conveyor 45 the forward end of the cake will contact with the chocolate coating on conveyor 45, while the rear end of the cake is held in a raised position by the conveyor 38. This permits the chocolate coating which covers conveyor 45 as hereinafter explained, to move under the cake before the rear end of the cake is released from conveyor 38 and permitted to contact fully with the chocolate coating on conveyor 45. It will be understood that conveyor 45 moves in the same direction as conveyor 38.

As shown in Fig. 7, a second deflector 140 is secured to casting 52 to turn the cake lengthwise on conveyor 45 if, for any reason, deflector 43 fails to turn the cake the required distance.

Still referring to Fig. 7, directly beneath the upper reach of conveyor 45, an imperforate plate 50 is secured to castings 52 and 53. Plate 50 extends crosswise between the side chains of the conveyor and lengthwise from a point adjacent shaft 47 to a point adjacent shaft 49. As shown in Fig. 3, plate 50 may be made in two sections, slidably connected to permit adjusting the length of plate 50, the adjustable section being designated 50ª. Such adjustment is provided to permit controlling the thickness of the under coating of the cake.

Beneath the lower reach of conveyor 45 a plate 51 is secured to the castings 52 and 53. As shown in Fig. 4, plate 51 extends sidewise between said castings 52 and 53, and, as shown in Fig. 3, extends lengthwise from a point spaced from shaft 49 to beyond shaft 47. The end of plate 51 adjacent shaft 47 is bent upward around sprocket wheel 46 for a purpose hereinafter explained.

As shown in Fig. 3, chocolate coating for the ice cream cakes is sprayed downward onto conveyor 45 and plate 50 from an enrober head 152. The chocolate, which is designated D, is sprayed onto the top of the cakes as they pass beneath enrober head 152, and the chocolate thus sprayed covers the top, sides and ends of the cake. The bottom of the cake is covered by the coating material which accumulates on the plate 50 and which extends up through the cross rods of conveyor 45 and covers said cross rods. The effect of the plate 50 beneath the conveyor 45 is to produce a pool of chocolate coating material upon which the cakes are deposited and coated on their under sides. As the chocolate is sprayed from the enrober head 152 onto the conveyor 45 and the plate 50, it spreads in all directions, covering the conveyor and providing the pool of chocolate coating material referred to above. The thickness of the coating on the bottom of the cake may be controlled by adjusting the position of movable plate section 50ª toward or from shaft 49. When section 50ª is moved away from shaft 49 the pool of chocolate under conveyor 45 sinks below the cross rods before they reach the end of their forward travel, thus permitting part of the under coating to drop away from the cake before it is transferred to the take-off belt. Some of the surplus chocolate coating material thus sprayed onto plate 50 runs over the side chains of conveyor 45 and falls onto plate 51, where a pool of chocolate coating material accumulates. As conveyor 45 passes through the pool of chocolate which has accumulated on plate 51 it carries a portion of such chocolate with it when it passes around sprocket wheels 46, thereby insuring a full supply of chocolate coating material under a cake when it drops onto enrober conveyor 45 from conveyor 38. Surplus chocolate coating material from plates 50 and 51 falls into a tank 153 which carries the supply of chocolate coating material for the machine.

As shown in Fig. 4, the chocolate coating material is pumped from tank 153 to enrober head 152 by pump gears 54 which force the chocolate coating material from tank 153 to enrober head 152 through a passageway 155 provided in a casting 156 secured to side castings 52 and 53, and thence through passageways 55 in castings 52 and 53. One of the pump gears 54 is carried by a shaft 56 journaled in side castings 52 and 53 and meshes with the other pump gear 54, which is an idler gear. The pump gears are rotated through a sprocket wheel 57 on shaft 56, a sprocket chain 58 and a sprocket gear 59 fast on shaft 47.

As shown in Fig. 2, the pump gears 54 and conveyors 38 and 45 are all operated from motor 22 through belt 21 and a drive pulley 60 on a shaft 61, through the connections now to be described. Shaft 61 carries a sprocket wheel 62 which is connected to a sprocket wheel 63 on a stud shaft 64 by a sprocket chain 65. Stud shaft 64 carries a sprocket wheel 66 which meshes with an idler sprocket wheel 67, which in turn rotates a sprocket gear 68 fast on a drive shaft 69. As shown in Fig. 1, drive shaft 69 through a coupling 70, drives shaft 49 carrying sprocket wheels 48. Rotation of shaft 49 moves conveyor 45 and thereby rotates shaft 47 and through shaft 47 sprocket wheel 59 to operate the pump gears. Rotation of shaft 47 also rotates shaft 42 to move conveyor 38, through a sprocket wheel 71 on shaft 47, a sprocket chain 72, and a sprocket wheel 73 on shaft 42.

As shown in Figs. 3 and 8, mechanism is provided to smooth the upper surface of the coated confection after it passes the enrober head 152 and to control the thickness of the chocolate coating on the top of the cake. As the cake passes directly beneath the enrober head and the chocolate coating material is sprayed directly on the top surface of the cake, the coating on the top of the cake would be thicker than the coating on the sides and ends unless provision were made for removing a portion of the coating material which is sprayed on the top of the cake. As shown in Fig. 3, the mechanism for this purpose takes the form of a trowel 75, shaped as shown, and which is adapted to ride on the surface of each coated cake with sufficient pressure to wipe off excess coating material and reduce the coating to the desired thickness. Trowel 75 is secured to the lower extremities of two arms 76, the upper ends of which are secured to a frame 77 which is pivotally mounted on a member 78, which member itself is pivotally mounted between arms 79 and 80 carried by enrober head 152. The pivotal arrangement is such that the trowel 75 is permitted to pivot both horizontally and vertically to accommodate itself to uneven surfaces on the cake. The pressure of trowel 75 on the surface of the coated confection may be regulated by adjusting a weight 81 on a rod 82 carried by arms 83 and 84 of frame 77. To definitely limit the lowermost position of trowel 75, a screw 85 is carried by member 78, against which screw, arm 83 of frame 77 contacts when trowel 75 is lowered to a certain level. The level for contact may be adjusted by adjusting the screw 85. With this arrangement for horizontal and vertical pivoting, the trowel will tend to ride up away from the ice cream to a degree dependent upon the hardness of the chocolate, the speed of movement of the cake, and the area of the trowel in contact with the chocolate. Thus the trowel will ride upward slightly over high points on the cake and will swing and adjust itself to surfaces which are not level, and always the pressure of the trowel on the chocolate coating may be adjusted by the weight 81 to control the thickness of the coating.

Referring to Fig. 1, when the coated cake leaves the enrobing conveyor 45 it passes onto an endless take-off belt 90, which is located slightly below the conveyor 45. Belt 90 is preferably of rubber reenforced with fabric, and imperforate, thus providing a smooth even surface upon which the coated cake is deposited. As the chocolate coating is still soft when the cake reaches the belt 90, the smooth surface of the belt tends to flatten any ridges or unevenness of the under coating which may have resulted from contact with the cross rods of enrober conveyor 45.

Referring to Fig. 10, the belt 90 is trained over a roller 91 on a shaft 92 journaled in the side frames; thence over a roller 93 on a shaft 94 journaled in the side frames; thence over a roller 95 on a shaft 96 journaled in the side frames; thence downwardly into a water tank 97, and over a roller 98 on a shaft 99 supported by arms 100 and 101 pivoted respectively to shaft 96 and to a shaft 102 journaled in the side frames; and thence upwardly over a roller 103 carried by a shaft 104 journaled in the side frames. Shaft 96 is adjustable in a slot 105 to loosen or tighten the belt 90. Belt 90 is moved by a gear connection between shaft 49 and shaft 92, said connection consisting of a gear wheel 106 on shaft 49, an idler gear wheel 107 meshing with gear wheel 106, and a gear wheel 108 fast on shaft 92 and meshing with idler gear wheel 107.

Water tank 97 is provided primarily for the purpose of cooling the belt 90, so that the coating on the cakes may be quickly cooled and congealed after leaving enrober conveyor 45. The water in the tank may be kept at a low degree of temperature by ice or some other cooling medium. To prevent the chocolate coating from dissolving in the water on the belt 90, a small amount of soluble salts, such, for example, as commercial rock salt, may be placed in the water in tank 97. It has been found that a handful of rock salt for each ten gallons of water in the tank is sufficient to prevent the water on the surface of the belt 90 from becoming a solvent for the chocolate coating, while such an amount of salt is not enough to give any salty taste to the chocolate. The salt solution in the water also tends to reduce the temperature of the water in the tank and hence the temperature of the take-off belt 90, thus facilitating the cooling and hardening of the chocolate coating and making it possible to reduce the length of the take-off belt.

Referring to Figs. 10 and 11, provision is made to adjust the angle of roller 93 relative to roller 91 so that the belt 90 will travel in a straight line. Such means consists of screws 110, which are mounted to shift the bearings of shaft 94 longitudinally of the side frames.

Referring to the left hand side of Fig. 10, where the belt 90 leaves the tank 97 and passes over roller 103, a water scraper 111 is secured to the side frames to contact with belt 90 and scrape off the water from the upper surface of the belt at that point, the water thus scraped off dropping back into the tank.

Referring to the right hand side of Fig. 10, a scraper 112 is secured to the under side of the side frames to contact with the under side of the belt 90 at that point and scrape off any chocolate coating which may have adhered to the belt.

It should be noted that the roller 91 which drives belt 90 is preferably provided with a knurled surface over which the belt 90 passes. The knurls of the roller 91 are rounded so as not to cut the belt 90 while sinking into the rubber in a manner to provide great traction. With this arrangement a small roller 91 may be used without danger of the belt slipping on the roller.

Referring to Fig. 8, sprocket chain 58 which drives the pump gears may be tightened by a sprocket gear 115 carried by a plate 116 pivoted at 117 to side casting 53. Plate 116 is provided with a plurality of notches 118 adapted to receive a screw 119 to hold the plate 116 in any adjusted position.

Referring to Fig. 3, pump gears 54 continuously force the chocolate coating into passageway 155. Leading from passageway 155 to the respective bearings of the pump gears are ports 121, through which a portion of the chocolate is forced to lubricate the bearings. With this arrangement chocolate is continuously circulated under pressure through the bearings and is not permitted to accumulate and harden in the bearings.

Referring to Fig. 8, beneath conveyor 38 and located under top plate 3, is a drain tank 123 to receive any melted cream or cream chips which may drop from hopper A or conveyor 38, an opening being provided in the top plate 3 to permit such cream and chips to flow therethrough into tank 123. As shown in Fig. 4, tank 123 may be emptied through a drain cock 124.

Still referring to Fig. 4, directly beneath chocolate storage tank 153 a water tank 125 is provided. Tank 125 is filled with warm water to heat the chocolate in tank 153. Located in tank 125 is a heater 126 to maintain the temperature of the water. Such heater is preferably an electric heater. Tank 125 may be drained through a drain cock 127.

It should be noted that the several parts of the machine may be readily disassembled for cleaning. The cooling belt 90 and its support may be disconnected from the rest of the machine by removing two thumb screws 132. The enrober head 152 which carries the trowel 75, is merely set in place in side castings 52 and 53 and may be readily lifted out of place. The castings 52 and 53, carrying the conveyors 38 and 45 and the gear pumps 54, may then be readily removed, as also may the chocolate and drain tanks. Such an arrangement is particularly advantageous, as ice cream handling machines are usually cleaned after each day's run.

As shown in Fig. 9, the bottom plate of the enrober head 152 is provided with spraying holes which are preferably bunched near the center and set off from straight line arrangement to insure a complete covering of the pie with coating material.

In operation, the cake which is dropped onto conveyor 38 is moved thereby against deflector 63, which turns the cake in a lengthwise direction for deposit on enrobing conveyor 45. In the meantime, the pump gears have forced the chocolate from tank 153 upward into enrober head 152 and the chocolate is sprayed down upon enrobing conveyor 45 and plate 50, forming a pool of chocolate on plate 50. This pool of chocolate, as best shown in Fig. 3, spreads in all directions on plate 50, completely covering the cross rods of conveyor 45, so that when the cake leaves conveyor 38 it drops onto the pool of chocolate and is coated on its under side. The cake then passes beneath enrober head 152, which sprays chocolate over the top of the cake and covers the top, sides and ends of the cake with the chocolate coating. Trowel 75 then rides across the upper surface of the coated cake to remove excess coating therefrom. As the coated cake approaches the take-off end of conveyor 45 the pool of chocolate beneath the cake recedes to a point below the cross rods of conveyer 45, thereby reducing the thickness of the coating on the bottom of the cake. This recession of the pool may be controlled by adjusting the position of the end of plate 50ª relative to the end of conveyor 45. The coated cake is then transferred to the cold take-off belt 90, which smooths the coating on the under surface of the cake and quickly cools the coating.

A machine made according to this invention has many advantages. The arrangement of succeeding conveyors, one below the other, facilitates the transfer of the cakes from one conveyor to another and tends to produce a smooth uniform thickness of coating on all sides of the cake. The deflectors position each cake in turn directly beneath the enrober to receive a full deposit of coating material. The trowel mechanism may be adjusted to control the thickness of the top coating, thereby saving the cost of excess coating. Such mechanism also smooths off any unevenness of the upper surface of the cake, thus improving the appearance of the ultimate product. The enrobing mechanism coats all sides of the cake, including the top, bottom, sides and ends at one operation. The adjustable plate under the enrobing conveyor permits controlling the thickness of the under coating of chocolate, with a consequent saving of the cost of an excess under coating. The advantages of the smooth surfaced adjustable take-off belt passing through a well of cold salted water have been pointed hereinbefore, as have also the advantages of the connections between the several parts of the machine which facilitate disconnecting said parts for purposes of cleaning or repair. The portability of the machine also facilitates its use.

It will be understood that the invention is not to be limited to the specific embodiment shown for illustration, and that all of the features of the invention need not be used conjointly, as they may be used to advantage in various combinations and subcombinations as defined in the sub-joined claims.

I claim:

1. In a confection coating apparatus, in combination, an endless enrober conveyer including spaced cross rods supported in end chains, means for causing said conveyer to travel over a substantially horizontal path during at least a portion of its travel, whereby it is adapted to support the confection; enrobing means located above that portion of said conveyer traveling over said path for spraying enrobing material on the confection as it passes thereunder on said conveyer, said enrobing means including an enrobing head having staggered openings through which the enrobing material pours onto the confection, said openings being positioned so that more of the enrobing material pours through the central portion than the side portions thereof; a horizontal plate extending and adjustably mounted immediately below that portion of the conveyer traveling over said horizontal path, said plate cooperating with said enrobing means to form a moving pool of the enrobing material above that portion of the conveyer moving above the plate; means for adjusting the plate to control the length of said pool; and the spaced rods causing the pool to drop away from each confection as it moves from above the plate whereby extraneous enrobing material is removed from each confection, and causing surplus coating on the bottom of each confection to drain off.

2. A machine for coating frozen confections, comprising in combination, conveying means for receiving and advancing rectangular oblong cakes of confection toward the delivery end thereof, said conveyer sloping upwardly in the direction of its advance; an enrober conveyer having its receiving end positioned in a plane below the plane of the delivery end of said receiving conveyer and means for shifting said confection to position its longitudinal axis more nearly parallel with the direction of travel of the conveyer as it is transferred from the receiving conveyer to the enrobing conveyer whereby the forward end of each cake contacts with a pool of coating material on the enrober conveyer while the rear end of the cake is supported by the delivery end of the receiving conveyer; means for covering each cake while on the enrober conveyer with additional coating material; said enrobing conveyer being constructed and arranged to expose the coated cake to the surrounding air to permit cooling; and an imperforate cooled conveyer having its receiving end located below the end of the enrober conveyer for receiving and further cooling the coated confection.

3. A machine for coating confections comprising, in combination, an enrobing means to coat the individual pieces with coating material; said enrobing means including a perforated conveyer; an imperforate plate beneath the conveyer adjustable in length, and a coating material receptacle to discharge coating material downwardly onto the conveyer and adjustable plate, whereby a pool of coating material will accumulate on the plate and at least partially cover the conveyer to coat the under side of pieces of confection; and means for varying the length of the plate to vary the length of the pool and the thickness of the under coating.

4. In the process of coating chocolate on frozen confection by passing a core of the frozen confection through an enrobing machine and transferring the coated core from the enrobing machine to a cooling belt, that step which comprises cooling the belt by passing it through a refrigerated solution of salt and water whereby the chocolate coating is less likely to stick to the cooling belt.

WILFRED T. BIRDSALL.